United States Patent [19]

Barnard

[11] Patent Number: 5,393,427
[45] Date of Patent: Feb. 28, 1995

[54] PROCESS FOR THE BIOLOGICAL TREATMENT OF WASTEWATER

[76] Inventor: James L. Barnard, 300 - 4170 Still Creek Drive, Burnaby, British Columbia, Canada, V5C 6C6

[21] Appl. No.: 45,495

[22] Filed: Apr. 8, 1993

[30] Foreign Application Priority Data

Apr. 9, 1992 [ZA] South Africa .................. 92/2600

[51] Int. Cl.⁶ .......................................... C02F 3/30
[52] U.S. Cl. ................................ 210/605; 210/617; 210/625; 210/903; 210/906
[58] Field of Search ............... 210/603, 605, 615, 617, 210/623, 624, 625, 630, 903, 906

[56] References Cited

U.S. PATENT DOCUMENTS

| | | | |
|---|---|---|---|
| 3,654,147 | 4/1972 | Levin et al. | 210/906 |
| 4,183,808 | 1/1980 | Drnevich | 210/906 |
| 4,220,527 | 9/1980 | Udaka et al. | 210/906 |
| 4,487,697 | 12/1984 | Böhnke et al. | 210/605 |
| 4,488,968 | 12/1984 | Hong et al. | 210/906 |
| 4,676,906 | 6/1987 | Crawford et al. | 210/603 |
| 4,780,208 | 10/1988 | Böhnke et al. | 210/605 |
| 4,867,883 | 9/1989 | Daigger et al. | 210/605 |
| 4,919,815 | 4/1990 | Copa et al. | 210/603 |
| 5,022,993 | 6/1991 | Williamson | 210/906 |
| 5,098,572 | 3/1992 | Faup et al. | 210/906 |

FOREIGN PATENT DOCUMENTS 56-65693  6/1981  Japan .

Primary Examiner—Christopher Upton
Attorney, Agent, or Firm—Cooley Godward Castro Huddleson & Tatum

[57] ABSTRACT

A process and installation for the removal of organic matter, phosphate ions and nitrogenous compounds from sewage wastewater. The installation comprises a raw sewage feed line 12 shown feeding into a primary separation basin 14. The primary separation basin 14 has an overflow flow line 16, discharging separated effluent to an attached growth fermentation vessel or fermenter 18. The fermenter 18 is filled with solid supports 20 with sufficient voids therebetween to allow the effluent to pass through the supports 20 and to allow for the growth of fermenting bacteria (not shown) on the supports 20. The supports 20 are shown diagrammatically in the drawings, and can be in the form of rotating discs, hanging or suspended ropes which move as the liquid is passed through the system, a fluidized bed in which the solids are kept in suspension by upward movement of the liquid, rings, slats or plates. The liquid effluent then passes out of the fermenter 18, through flow line 26, for further processing.

10 Claims, 2 Drawing Sheets

PROCESS FOR THE BIOLOGICAL TREATMENT OF WASTEWATER

FIELD OF THE INVENTION

This invention relates to a process for the biological treatment of wastewater containing organic material, nitrogenous compounds and phosphates, for at least the partial removal of the organic material, nitrogenous compounds and phosphates therefrom. The invention also relates to an installation for the biological treatment of wastewater containing organic material, nitrogenous compounds and phosphates, for at least the partial removal of the organic material, nitrogenous compounds and phosphates therefrom.

SUMMARY OF THE INVENTION

According to one aspect of the invention there is provided a process for the biological treatment of wastewater containing organic material, nitrogenous compounds and phosphates, for at least the partial removal of the organic material, nitrogenous compounds and phosphates, which includes the steps of:

subjecting the wastewater to a primary solids separation stage;

subjecting at least the liquid part of the wastewater to an anaerobic fermentation stage in which normally occurring fermenting organisms growing on a solid support located in the fermentation stage and over which the liquid passes convert organic material in the form of complex organic compounds which are in colloidal suspension or solution, to produce an effluent containing volatile fatty acids;

subjecting at least a liquid part of the wastewater to a denitrification stage in which dissolved nitrogenous compounds are at least partially removed by reduction thereof to nitrogen gas;

subjecting at least a portion of the resulting effluent to a contact stage in which a phosphate ion absorbing organism present therein is exposed to a limited amount of oxygen in a reduced concentration of nitrogenous compounds, the oxygen being sufficient to enable said organism to absorb the volatile fatty acid ions as a food source and to prevent said organism from releasing excessive amounts of phosphate ions from the effluent;

subjecting the effluent to an aerobic stage in which the effluent is aerated to provide externally available oxygen in sufficient quantity to enable the phosphate ion absorbing organism to undergo cell growth by absorbing phosphate ions from the effluent, thereby reducing the overall phosphate ion concentration in the effluent to a level lower than that of the effluent entering the contact stage; and subjecting the effluent to a secondary solids separation stage, the anaerobic fermentation stage being external and separate from the contact stage.

In one embodiment of the process of the invention, the wastewater may first be subjected to the primary solids separation stage, followed by subjecting the effluent therefrom to the anaerobic fermentation stage.

The solids removed may be subjected to a sludge treatment and disposal stage, and resulting effluent passed to the effluent from the primary solids separation stage.

Some liquid effluent from the anaerobic fermentation stage may be recycled back to the anaerobic fermentation stage.

In another embodiment of the process of the invention, the wastewater may first be subjected to the anaerobic fermentation stage, followed by subjecting the product thereof to the primary solids separation stage.

The solids removed may be subjected to a sludge treatment and disposal stage, and resulting effluent passed to the effluent from the primary solids separation stage.

Some of the effluent from the anaerobic fermentation stage may be recycled back to the anaerobic fermentation stage.

In yet another embodiment of the process of the invention, the primary solids separation stage and the anaerobic fermentation stage may be combined, the wastewater being subjected to anaerobic fermentation during the primary solids separation stage.

The solids removed may be subjected to a sludge treatment and disposal stage, and the resulting effluent passed to the effluent from the primary solids separation and anaerobic fermentation stage.

In any one of the above embodiments, the denitrification stage may comprise:

a holding stage intermediate the anaerobic fermentation stage and the contact stage, denitrification in the holding stage occurring partially by endogenous respiration and partially by reaction of the nitrogenous compounds with the volatile fatty acids from a portion of the effluent from the anaerobic fermentation stage; and an anoxic stage intermediate the contact stage and the aerobic stage.

Activated sludge from the secondary solids separation stage may be recycled to the holding stage to remove surplus nitrogenous compounds before passing the resultant effluent to the contact stage. The surplus solids may be wasted to a solids dewatering stage to maintain the mass at equilibrium.

The activated sludge may be passed through a secondary attached growth fermenter to enhance removal of nitrogenous compounds before the activated sludge is passed to the holding stage. Instead, activated sludge from the secondary solids separation stage may be recycled directly to the contact stage.

Part of the effluent from the aerobic stage may be recycled to the anoxic stage.

The invention may also be applied to a so-called polishing treatment process for trickling filter effluent. In this application, a portion of the effluent from the primary separation stage could be passed through an attached growth fermentation system, thus producing the volatile fatty acids needed to remove phosphates in the polishing stage, while the remainder of the effluent from the primary separation stage is passed through a trickling filter.

The polishing stage may be similar to the process described in conjunction with the invention, i.e. the effluent from the attached growth fermentation stage being passed to a contact stage and/or an anoxic stage as described above, the effluent of which is passed, with the effluent from the trickling filter, to an aerobic stage as described above, from which the resultant stream is fed to a final solids removal stage.

The removal of nitrates from the final sludge settling stage could be achieved in a holding tank through endogenous respiration of bacteria; instead or in addition, nitrates could be reduced as described above by using an attached growth fermentation system.

Thus, in a further embodiment of the process of the invention, part of the effluent from the primary solids separation stage may be passed through a trickling filter; part of the effluent from the trickling filter may be passed to the aerobic stage; and the other part of the effluent from the trickling filter may be recycled to the primary solids separation stage.

In the latter embodiment of the process of the invention, the denitrification stage may comprise a holding stage intermediate the anaerobic fermentation stage and the contact stage, denitrification in the holding stage occurring partially by endogenous respiration and partially by reaction of the nitrogenous compounds with the volatile fatty acids from a portion of the effluent from the anaerobic fermentation stage, and the activated sludge from the secondary solids separation stage is recycled to the holding stage to remove surplus nitrogenous compounds before passing the resultant effluent to the contact stage.

Instead, the anaerobic fermentation stage and the denitrification stage may be combined and the effluent therefrom passed for total discharge to the contact stage.

The phosphate ion absorbing organism may be *Acinetobacter spp.*

Conditions during the fermentation stage may be selected and controlled so that acetic acid and/or salts thereof form the major portion by mass of volatile fatty acids produced.

In the biological treatment of wastewater containing organic material, nitrogenous compounds and phosphates, to remove such phosphates and at least part of the nitrogenous compounds, it has been found that *Acinetobacter spp.* are capable of taking up phosphates from a surrounding liquid medium in the presence of externally available oxygen. These organisms feed on acetic acid or salts thereof, and must accordingly be provided with acetate ions as a food source.

It is possible to produce acetate ions from the wastewater to be treated, by subjecting a sludge portion of the wastewater, resulting from a solids separation treatment, to anaerobic fermentation to produce the required acetate ions. However, a disadvantage of such a method would be that the organic carbon already removed from the wastewater, would be returned to the effluent portion to be treated aerobically, in the form of acetate ions.

The primary solids separation stage results in a sludge portion and an effluent portion which effluent portion may be rich in acetate ions if the wastewater has previously or simultaneously been subjected to anaerobic fermentation, or which effluent portion is subsequently subjected to anaerobic fermentation to produce an effluent rich in acetate ions. The invention relates primarily to the further treatment of the effluent portion, while the treatment of the sludge portion involves a secondary solids treatment process.

Although it is also possible, as mentioned above, to subject the sludge portion of wastewater obtained resulting from a solids separation treatment, to anaerobic fermentation to produce acetate ions, the process of the present invention is believed to be more advantageous, as it obviates the return of solid organic matter already removed but subsequently rendered rich in acetate ions, to the effluent portion which effluent portion is to be further treated in accordance with the invention.

The acetate ions produced during the anaerobic fermentation stage may, as mentioned above, typically be in the form of acetic acid and/or salts of acetic acid. However, other short-chain volatile fatty acids, other than acetic acid, such as propionic acid, butyric acid etc and/or salts thereof may also be produced during the fermentation. These fatty acids may contribute towards providing a carbon source utilised by the *Acinetobacter spp.* responsible in the contact and anoxic stages for phosphate ion release, as explained in more detail below.

Without wishing to be bound by theory, the Applicant believes that *Acinetobacter spp.* are aerobes which feed exclusively on acetic acid, i.e. acetate ions. They have the ability to accumulate and store phosphates in the form of polyphosphates in their cells, which stored polyphosphates can act as an energy source when the organisms are in an anoxic or anaerobic environment. Although the *Acinetobacter spp.* are aerobes which require oxygen for growth and cell division, they are thus believed to be capable of breaking down stored phosphates, passing soluble phosphate ions out through their cell walls and absorbing acetate ions inwardly through their cell walls, even in the absence of an external electron acceptor.

Again without wishing to be bound to a theoretical explanation, the Applicant believes that the process of the invention will, in broad outlines, have the effect of removing phosphates in the following manner:

In normal aerobic conditions *Acinetobacter spp.* take up acetate ions as food source, and are further capable of taking up phosphate ions in the presence of externally available oxygen and storing such phosphates as polyphosphates within their cellular structure. When no or little external oxygen is available, acetate ions will still be absorbed as a food source while energy will be obtained from the stored polyphosphates, and in the process phosphate ions will be released. The bacteria will accordingly become impoverished of stored phosphates.

When the *Acinetobacter spp.* are again placed in aerobic conditions with externally available oxygen, cell growth and cell division will take place and the phosphate ions previously released will be reabsorbed. Additional phosphate ions will also be absorbed and stored, whereby the overall phosphate ion concentration in the surrounding medium will be reduced.

However, when *Acinetobacter spp.* are subjected to anaerobic conditions for an excessive length of time, it is believed that excessive phosphate ions may be released to the surrounding medium, to an extent that the bacteria will be unable, when placed in aerobic conditions again, of reabsorbing such excessively released phosphate ions.

In regard to this excessive release of phosphate ions which has been found to take place in the absence of externally available oxygen, the Applicant believes that the presence of externally available oxygen, even in limited supply, terminates and in fact inhibits such excessive release of phosphate ions.

In the light of the foregoing suggested theoretical explanation, the mechanism of the process according to the invention may be further explained, as follows:

In the primary solids separation stage, the wastewater is separated, e.g. by settling, into a sludge portion containing some organic matter, and a liquid portion likewise containing organic matter. In the anaerobic fermentation stage, which may as indicated above occur either before or after the primary separation or even simultaneously with the primary separation, acetic acid (providing acetate ions) as well as other volatile fatty acids are produced. The acetate ions will serve as food for the *Acinetobacter spp.* during the contact and anoxic stages.

It is believed that in the contact and anoxic stages, when only a limited supply of external oxygen is available, *Acinetobacter spp.* absorb acetate ions as a food source while releasing phosphate ions to the surrounding liquid. A limited supply of external oxygen is made available in the contact and anoxic stages by containing the liquid being treated in vessels open to the air, and preferably also by stirring the liquid.

The little oxygen which does so become available in the contact and the anoxic stages is believed to limit excessive biological release of soluble phosphate ions by the *Acinetobacter spp.*

The supply of oxygen in the contact and anoxic stages should preferably only be sufficient to limit the biological release of soluble phosphate ions by the *Acinetobacter spp.* to a level whereby the freed phosphate ions can be reabsorbed by the *Acinetobacter spp.* in the later aerobic stage. It is believed that this may further be ensured by limiting the accumulation of carbon dioxide and/or dissolved carbonate ions in the contact and anoxic stages.

The addition of the acetate rich effluent to the contact stage may also result in the passage of some acetate ions to the anoxic stage, where the acetate ions are believed to facilitate the denitrification of nitrates, as explained more fully below.

In the aerobic stage the *Acinetobacter spp.* are believed to grow and multiply and reabsorb phosphate ions in the presence of dissolved oxygen, thereby reducing the concentration of the dissolved phosphate ions in the effluent stream entering the secondary separation stage. The concentration of phosphate ions in the stream will be reduced to a level lower than that of the effluent stream entering the contact stage.

In the aerobic stage bacterial breakdown of organic compounds from the liquid may further take place, while ammoniacal compounds are bacterially converted to their nitrate forms, and while some of the bacteria simultaneously take up phosphates. A liquid stream containing microorganisms may accordingly be separated from the effluent leaving the aerobic stage, which effluent has a high concentration of nitrates, to be recycled to the anoxic stage.

The nitrates so recycled are believed also to act to resist the excessive biological release of soluble phosphate ions in the anoxic stage, i.e. above the level at which said phosphate ions can biologically be absorbed again by the *Acinetobacter spp.* in the aerobic stage.

As used herein, the "contact stage" thus refers to a stage wherein the concentration of oxygen, nitrites and nitrates is such that little fermentation can occur, but aerobic or anaerobic respiration is minimized. Correspondingly, the "denitrification stage" is a stage wherein there is a limited supply of oxygen and conditions are such that endogenous anaerobic respiration is promoted, thereby allowing the heterotrophic organisms, which can use nitrate or nitrite ions as final electron acceptors, to reduce these ions to nitrogen gas. However, the conditions are such that the reduction of sulphates to sulphides is minimized. It will thus be evident that this aspect of the invention provides for the at least partial removal of nitrogenous matter from the wastewater.

The "aerobic stage" is a stage in which oxygen is supplied so that the oxygen will serve as the final electron acceptor in the respiratory chain of the heterotrophic organisms, i.e. in preference to the nitrates and nitrites. The *Acinetobacter spp.* metabolize the food (acetate ions stored as poly-$\beta$-hydroxybutyrate) taken up in the contact zone, and using oxygen as a final electron acceptor, convert adenosine diphosphate (ADP) to adenosine triphosphate (ATP), thus storing energy and at the same time removing phosphate ions from the surrounding liquid.

In the process of metabolizing the stored acetates, the *Acinetobacter spp.* may have sufficient energy to take up surplus phosphates in the aeration stage and to store them as polyphosphates. The further energy so stored may in turn be used for the uptake of acetates in the contact and anoxic zones, e.g. when a stream is separated from the effluent leaving the aeration stage to be recycled to the anoxic stage, as indicated above.

It is believed that there is a limit to the amount of phosphates that the *Acinetobacter spp.* can accumulate and that the limit is related to the amount of food taken up by the organisms in the contact and anoxic stages. Hence, the limit also relates to the amount of phosphates released in this stage.

As indicated above, it has been found that when *Acinetobacter spp.* are exposed to prolonged anaerobic conditions, excessive phosphates may be released without a concomitant uptake of food, such excessive release of phosphates hereinafter referred to as the secondary release of phosphates. This may result in the bacteria not having sufficient energy to take up sufficient quantities of phosphates in the aeration stage.

As mentioned above, the *Acinetobacter spp.* are believed to take up acetate primarily in the contact stage.

The invention extends, broadly, to a process for the biological treatment of wastewater containing organic material, nitrogenous compounds and phosphates, for at least the partial removal of the organic material, nitrogenous compounds and phosphates, which includes the steps of:

subjecting at least the liquid part of the wastewater to an anaerobic fermentation stage in which normally occurring fermenting organisms growing on a solid support over which the liquid passes convert organic material in the form of complex organic compounds which are in colloidal suspension or solution, to produce an effluent containing volatile fatty acids;

subjecting at least a portion of the resulting effluent to a contact stage, a phosphate ion absorbing organism present therein is exposed to a limited amount of oxygen in a reduced concentration of nitrogenous compounds, the oxygen being sufficient to enable said organism to absorb the volatile fatty acid ions as a food source and to prevent said organism from releasing excessive amounts of phosphate ions into the effluent; and subjecting the effluent to an aerobic stage in which the effluent is aerated to provide externally available oxygen in sufficient quantity to enable the phosphate ion absorbing organism to undergo cell growth by absorbing phosphate ions from the effluent, thereby reducing the overall phosphate ion concentration in the effluent to a level lower than that of the effluent entering the contact stage.

The anaerobic fermentation stage may be external and separate from the contact stage.

Instead, the anaerobic fermentation stage and the contact stage may be effected in a single vessel.

According to another aspect of the invention, there is provided an installation for the biological treatment of wastewater containing organic material, nitrogenous compounds and phosphates, for at least the partial removal of the organic material, nitrogenous compounds and phosphates therefrom, which installation is arranged for the inflow therein of wastewater to be treated and has a liquid flow line for the further flow therethrough of at least the liquid part of the wastewater to be treated and comprises:

a primary solids separation stage in the form of a primary separation basin having an inlet, an outlet for solids and an outlet for effluent connected to the liquid flow line;

a fermentation stage in the form of a fermentation vessel or fermenter having an inlet and an outlet connected to the liquid flow line and containing a solid support to which fermenting organisms can attach themselves and grow;

a contact stage in the form of a liquid reservoir open to the air and having an inlet and an outlet, the inlet being arranged to receive effluent from the liquid flow line from the fermentation and primary solids separation stages;

a denitrification stage in the form of at least one denitrification vessel exposed to the air and arranged to receive effluent including dissolved nitrogenous compounds from within the installation and to release effluent having a reduced concentration of nitrogenous compounds into the installation;

an aerobic stage in the form of an aerobic vessel provided with means for aerating liquid therein and having an inlet and an outlet, the inlet being arranged to receive effluent having a reduced concentration of nitrogenous compounds from within the installation, and the outlet being arranged to release effluent having a reduced phosphate ion concentration; and a secondary solids separation stage in the form of a sedimentation vessel for separating solids from a liquid portion of the wastewater, the separation stage having a liquid outlet, a solids outlet and an inlet arranged to receive effluent from the outlet of the aerobic stage, the fermentation vessel being external and separate from the contact and aerobic vessels.

In one embodiment of the installation of the invention, the primary solids separation stage may precede the fermentation stage.

In another embodiment of the installation of the invention, the fermentation stage may precede the primary solids separation stage.

The sludge of the primary separation stage will not be retained in the system; only the resultant effluent will be fed to the further processing stages.

According to a further feature of the invention the sludge from the primary solids separation stage may be fed to a gravity thickener, the resultant thickened sludge being removed to a sludge disposal system. Return liquor removed from the gravity thickener may be passed through the attached growth fermentation system with the effluent from the primary solid separation stage, and as such liquors are of a reduced or septic form, this may enhance the process of fermentation in the attached growth fermentation system. The fermentation taking place in the attached growth fermentation stage may produce acids and may thus have the effect of lowering the pH value of the liquid. However, since the acetates are subsequently absorbed by organisms in the process, there is no need for neutralization of the pH.

The installation may thus include a sludge treatment stage in the form of a gravity thickener arranged to receive sludge from the primary solids separation stage and having a sludge outlet to a sludge disposal system, and an effluent outlet to which is connected a pumping device and a flow line for passing effluent to the effluent from the primary solids separation stage.

The fermentation stage may include a recycle flow line and pumping device for recycling some of the liquid effluent from the fermentation stage back to the fermentation stage. The liquid in the fermentation stage may be diluted by recycling a portion of the resulting liquid stream to avoid high local pH values which may inhibit the development of volatile fatty acids. At the same time, the recycling may help to reduce the production of methane, which is believed to be detrimental to the process, or hydrogen sulphide which is odorous.

In yet another embodiment of the installation of the invention, the primary solids separation stage and the fermentation stage may be combined, the primary separation basin serving also as a fermentation vessel.

In the latter embodiment, the installation may include a sludge treatment stage in the form of a gravity thickener arranged to receive sludge from the combined fermentation and primary solids separation stage and having a sludge outlet to a sludge disposal system, and an effluent outlet to which is connected a pumping device and a flow line for passing effluent to the effluent from the combined fermentation and primary solids separation stage.

In any of the above embodiments of the installation of the invention, the solid support in the fermentation vessel may include contact surfaces which in use are fully submerged and have large interstitial openings on which fermenting bacterial organisms become attached by growth, over which growth attached organisms the liquid stream is in use passed to enable the attached organisms to convert organic material in the form of complex organic compounds which are in colloidal suspension or solution, to volatile fatty acids.

The contact surfaces of the solid support may be mobile and selected from the group consisting in rotating discs, hanging or suspended ropes which move as the liquid is passed through the system, and a fluidized bed in which the solids are kept in suspension by upward movement of the liquid. Excessive growth of organisms may lead to a buildup of bacterial layers on the contact surfaces; the excess organisms may be sloughed and may be allowed to settle in the primary solids removal stage where the fermentation stage precedes the primary solids removal stage.

Instead, the contact surfaces may be static and selected from the group consisting in rings, slats, plates, and the like.

In use, the fermenting organisms grow upon the contact surfaces and they reduce complex organic compounds which are in colloidal suspension or solution to simpler organic acids such as short-chain volatile fatty acids, in particular acetic acid (providing acetate ions). The contact surfaces may be of any suitable material, eg synthetic plastics material, ceramic material, wood, glass etc.

The attached growth system may in fact be used with wastewater where no primary solids removal stage is used. In such a case the raw wastewater will be passed through the attached growth fermentation system prior to being fed to the contact stage.

As already mentioned above, effluent passing from the attached growth fermentation stage may be recirculated through the attached growth fermentation stage, to improve the contact between the bacteria growing on the contact surfaces and the liquid stream containing the organic compounds, and also to reduce high pH values.

The rate of recycle may vary from 0.1 to 10 times the average rate of inflow. The recycling may also have the effect of avoiding overloading of the organisms at the inlet of the attached growth fermentation system. In practice, it may be desired to pass only part of the wastewater through an attached growth fermentation stage, while the remainder may be fed directly to the contact stage or to a sludge holding tank.

The attached growth fermentation system may produce odours and thus the system may be covered and the air therein extracted for the removal of such odours.

It is believed that the provision of an attached growth fermentation system as set out herein is advantageous as it reduces the period during which the phosphate ion absorbing organisms are deprived of oxygen in the contact stage and thus also reduces possible secondary release of phosphates by the organisms.

The denitrification stage may comprise a holding vessel intermediate the fermentation vessel and the contact vessel; and an anoxic vessel intermediate the contact vessel and the aerobic vessel, both the holding vessel and the anoxic vessel being provided with stirring devices for keeping any solids in suspension.

The installation may include a flow line interconnecting the outlet of the sedimentation vessel of the secondary solids separation stage and the inlet of the holding vessel, and a pumping device for pumping activated sludge from the sedimentation vessel to the holding vessel.

Instead or in addition, the installation may include a flow line interconnecting the outlet of the sedimentation vessel of the secondary solid separation stage and the inlet of the contact vessel, and a pumping device for pumping activated sludge from the sedimentation vessel to the contact vessel.

The installation may include a secondary attached growth fermenter connected into the flow line, for at least partial removal of nitrogenous compounds from the sludge prior to passing the sludge to the holding vessel.

The outlet of the aerobic vessel may incorporate a recycle outlet for recycling effluent to the inlet of the anoxic vessel, and may include a flow line interconnecting the recycle outlet of the aerobic vessel to the inlet of the preceding anoxic vessel; and a pumping device for recycling part of the effluent from the aerobic vessel to the anoxic vessel.

In a further embodiment, the installation of the invention may include a trickling filter; a flow line connecting the effluent outlet of the primary settling tank to the trickling filter for passing a portion of the liquid effluent from the primary separation basin to the trickling filter; a flow line connecting the outlet of the trickling filter to the aerobic vessel for passing a portion of the liquid effluent from the trickling filter to the aerobic vessel; a flow line connecting the outlet of the trickling filter to the primary separation basin; and a pumping device for recycling part of the effluent from the trickling filter to the primary separation basin.

In the latter embodiment of the installation, the denitrification stage may include a holding vessel and a flow line may be provided interconnecting the solids outlet of the sedimentation vessel of the secondary solids separation stage and the inlet of the holding vessel; and a pumping device may be provided for recycling activated sludge from the sedimentation vessel to the holding vessel.

Instead, the fermentation vessel and the denitrification vessel may be combined and the effluent therefrom passed to the liquid flow line for total discharge into the contact vessel.

The invention extends, broadly, to an installation for the biological treatment of wastewater containing organic material and phosphates, for at least the partial removal of the organic material and phosphates therefrom, which installation is arranged for the inflow therein of wastewater to be treated and has a liquid flow line for the further flow therethrough of at least the liquid part of the wastewater to be treated and comprises:

a fermentation zone containing a solid support to which fermenting organisms can attach themselves and having an inlet and an outlet connected to the liquid flow line;

a contact zone open to the air and having an inlet and an outlet connected to the liquid flow line; and an aerobic zone provided with means for aerating liquid therein and having an inlet and an outlet, the inlet being arranged to receive effluent from the contact zone and the outlet arranged to release effluent having a reduced soluble phosphate ion concentration.

The installation may include a secondary solids separation stage in the form of a sedimentation vessel for separating solids from a liquid portion of the wastewater to yield a clear effluent having less than 20 mg of suspended filterable solids per liter, and activated sludge. The installation may include a flow line and pumping device connected to the sedimentation vessel for recycling the activated sludge to the contact zone. The installation may include a flow line connecting the sedimentation vessel to a sludge de-watering unit for de-watering surplus activated sludge.

The fermentation zone and the contact zone may be in the form of a fermentation vessel and a contact vessel respectively, which vessels are external and separate from one another.

Instead, the contact zone and the fermentation zone may be in the form of a single vessel containing the solid support.

The Applicant believes that most of the organic compounds normally discharged for treatment by the process and installation of the invention are converted to volatile fatty acids in the attached growth fermentation stage, and hence there is a saving in energy in the operation of the process and installation; is if the process and installation had been based, conventionally, upon the fermentation of sludge from the primary settling stage as a source of food for the phosphate ion absorbing organisms, an additional carbon source would have had to be added to the system, thus increasing the energy consumption of the system.

More detailed features of the installation and process will emerge from what is described hereinbelow with regard to particular embodiments of the present invention.

BRIEF DESCRIPTION OF THE DRAWINGS

The invention will now be described, by way of example, with reference to the accompanying diagrammatic drawings, in which.

DESCRIPTION OF THE PREFERRED EMBODIMENTS

Figure 1:
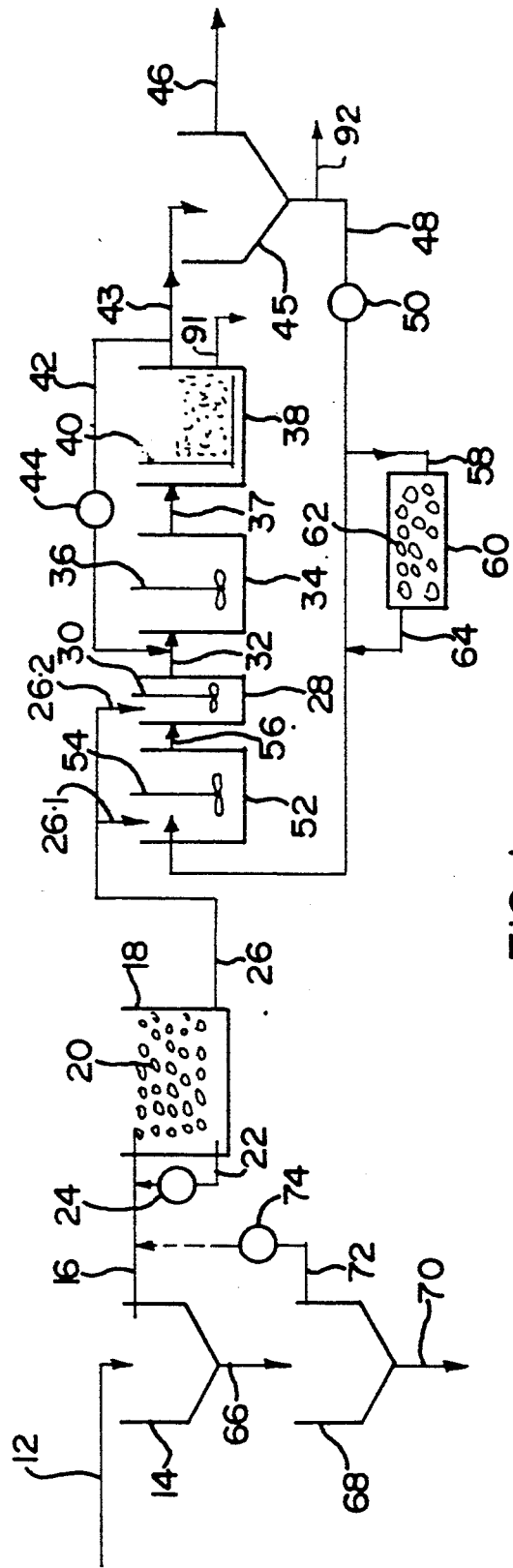
FIG. 1 shows a flow sheet of an installation according to one aspect of the invention for use in accordance with the process of the present invention, for the removal of organic matter, phosphate ions and nitrogenous compounds from sewage wastewater.

In FIG. 1 of the drawings, an installation according to one aspect of the invention for use in accordance with the process of the present invention is shown, for the removal of organic matter, phosphate ions and nitrogenous compounds from sewage wastewater.

The installation comprises a raw sewage feed line 12 shown feeding into a primary separation basin 14. The primary separation basin 14 has an overflow flow line 16, discharging separated effluent to an attached growth fermentation vessel or fermenter 18. The fermenter 18 is filled with solid supports 20 with sufficient voids therebetween to allow the effluent to pass through the supports 20 and to allow for the growth of fermenting bacteria (not shown) on the supports 20. The supports 20 are shown diagrammatically in the drawings, and can be in the form of rotating discs, hanging or suspended ropes which move as the liquid is passed through the system, a fluidized bed in which the solids are kept in suspension by upward movement of the liquid, rings, slats or plates. The liquid effluent then passes out of the fermenter 18, through flow line 26.

Some liquid effluent may be recycled by means of a pumping device 24 back to the inlet of the fermenter 18 via a flow line 22. The liquid effluent passes from the attached growth fermenter 18, via the flow line 26 into the contact vessel 28 which is open to the atmosphere and is provided with a stirring device 30 for keeping any solids (not shown) in suspension. Some of the effluent from the fermenter 18 is also fed into a holding vessel 52 (to which further reference will be made below), the vessel 52 also being open to the air and provided with a stirring device 54. Branch feed lines 26.1 and 26.2 feed into vessels 52 and 28 respectively.

The effluent from the contact vessel 28 is then passed through flow line 32 to the anoxic vessel 34, which is again open to the air and also provided with a stirring device 36 for keeping any solids in suspension.

The liquid effluent then passes from the anoxic vessel 34 to an aeration vessel 38 via a flow line 37. Air is supplied to this vessel 38 by means of an aeration mechanism 40. Part of the effluent may be recycled to the flow line 32 via a flow line 42 by a pumping device 44, thus returning to the anoxic vessel 34. The effluent so recycled contains a high concentration of nitrates formed in the aeration vessel 38, where ammonium ions have been oxidised. The liquid thus flowing into the anoxic vessel 34 contains nitrates formed in the aeration vessel 38. In the absence of a large supply of oxygen, the nitrates entering the anoxic vessel 34 are reduced to nitrogen gas through anaerobic respiration of organisms, using nitrate ions as electron acceptors and thus reducing the nitrates to nitrogen gas in the process.

In the contact vessel 28, *Acinetobacter spp.* which are present absorb acetate ions through their cell membranes. Using stored polyphosphate as an energy source, phosphates are released to the surrounding liquid, in the process of absorbing acetate ions. A limited amount of air is supplied, but the supply of oxygen is maintained at a suitable level to prevent possibly the secondary release of phosphates.

At the same time, nitrogenous compounds are hydrolysed to ammonium ions in the contact vessel 28. The ammonium and the released phosphate ions are passed to the anoxic vessel 34 via the flow line 32. These substances undergo little change in this later vessel 34. As mentioned above, nitrates entering the anoxic vessel 34 are reduced to nitrogen gas.

The ammonium and phosphate ions pass to the aeration vessel 38 via the flow line 37, wherein remaining carbon compounds are used as an energy source by heterotrophic bacteria. At the same time ammonium ions are oxidized to nitrate ions and the *Acinetobacter spp.* metabolize the stored food, producing carbon dioxide and water while using the energy so obtained to take up all remaining phosphates in solution and to store them in the form of polyphosphates.

The liquid stream is displaced from the aeration vessel 38 through a flow line 43 to a secondary separation apparatus in the form of a sedimentation vessel 45 where the solids are allowed to settle to the floor by gravity and the clear effluent to be discharged through a flow line 46 to a body of receiving water or the like.

The sludge portion remaining in the sedimentation vessel 45, i.e. so-called activated sludge, is passed through a flow line 48 and is pumped by a pumping device 50 to the holding vessel 52. This vessel 52 is provided with a stirrer 54 for keeping the solids in suspension. The purpose of this vessel 52 is to reduce surplus nitrates before recycling the liquid back to the contact vessel 28 through the flow line 56.

If desired, part of the activated sludge from the sedimentation vessel 45 is passed via a flow line 58 to a secondary attached growth fermenter 60 for the reduction of nitrates by the organisms growing on the solid supports 62 contained therein. The sludge then passes via a flow line 64 back to the flow line 48 and into the holding vessel 52. A flow line 91 is provided leading from the aerobic vessel 38 to a sludge de-watering unit (not shown) to pass surplus activated sludge to the sludge de-watering unit. A flow line 92 can also be provided leading from flow line 48 to pass surplus activated sludge to the sludge de-watering unit.

The solids removed in the primary sedimentation basin 14 are removed through a flow line 66 to sludge treatment facilities, where the sludge may be processed in accordance with known techniques, e.g. fed to a gravity thickener 68. Thickened sludge is removed through flow line 70 to a sludge disposal system. The effluent removed from the thickener 68 is pumped through a flow line 72 by a pumping device 74 to the effluent stream from the primary separation basin 14 in flow line 16.

Alternatively, if the thickener 68 is situated at a higher level than the primary separation basin 14, the effluent could be allowed to flow through the flow line 72 to the flow line 16 by gravity feed.

Figure 2:
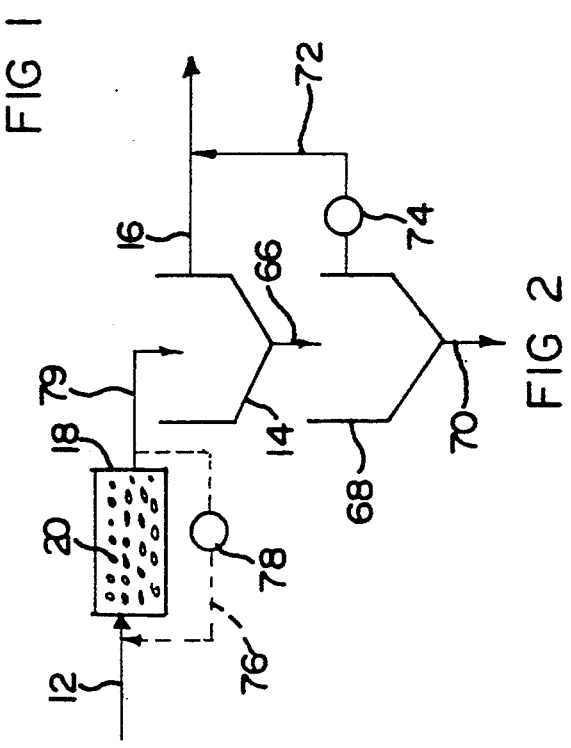

In FIG. 2, the same reference numerals are used for the same items or parts of the installation shown in FIG. 1 unless otherwise specified. In the installation of FIG. 2, the influent raw wastewater is discharged directly to the attached growth fermenter 18. The wastewater passes through the solid supports 20 supporting the growth of the anaerobic organisms as described above. Again, part of the stream from the fermenter 18 is recycling through a flow line 76 back to the fermenter 18 by a pump 78. The main stream from the fermenter 18 is passed via a flow line 79 to the primary separation basin 14. In all other respects the other flow lines and treatment vessels etc are similar to those in FIG. 1.

Figure 3:
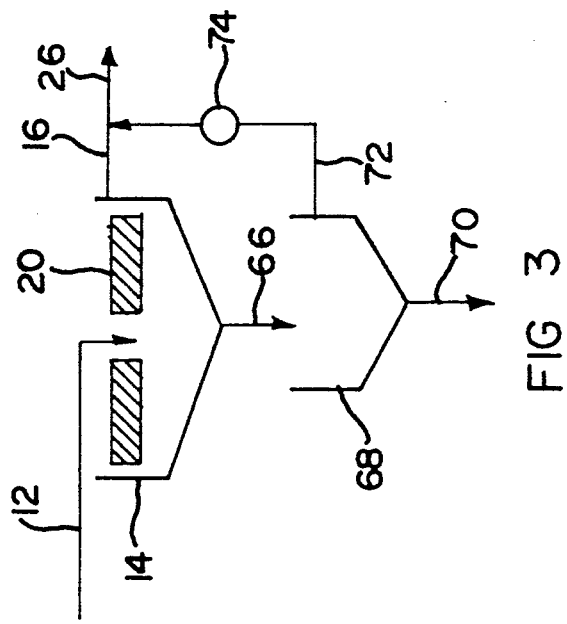
FIGS. 2 and 3 show alternative embodiments of the attached growth fermentation stage.

In FIG. 3, the same reference numerals are used for the same items or parts of the installation shown in FIG. 1 unless otherwise specified. In this installation, the influent wastewater is passed via the feed line 12 directly to the primary separation basin 14. However, the solid supports 20 (diagrammatically shown) for the attached growth system are placed within the basin 14 such that the liquid passes through the solid supports 20 to overflow into the flow line 16. The effluent is not however recycled back through the fermenter 18. In all other aspects, the flow lines and treatment vessels etc are similar to and numbered as in FIG. 1.

Figure 4:
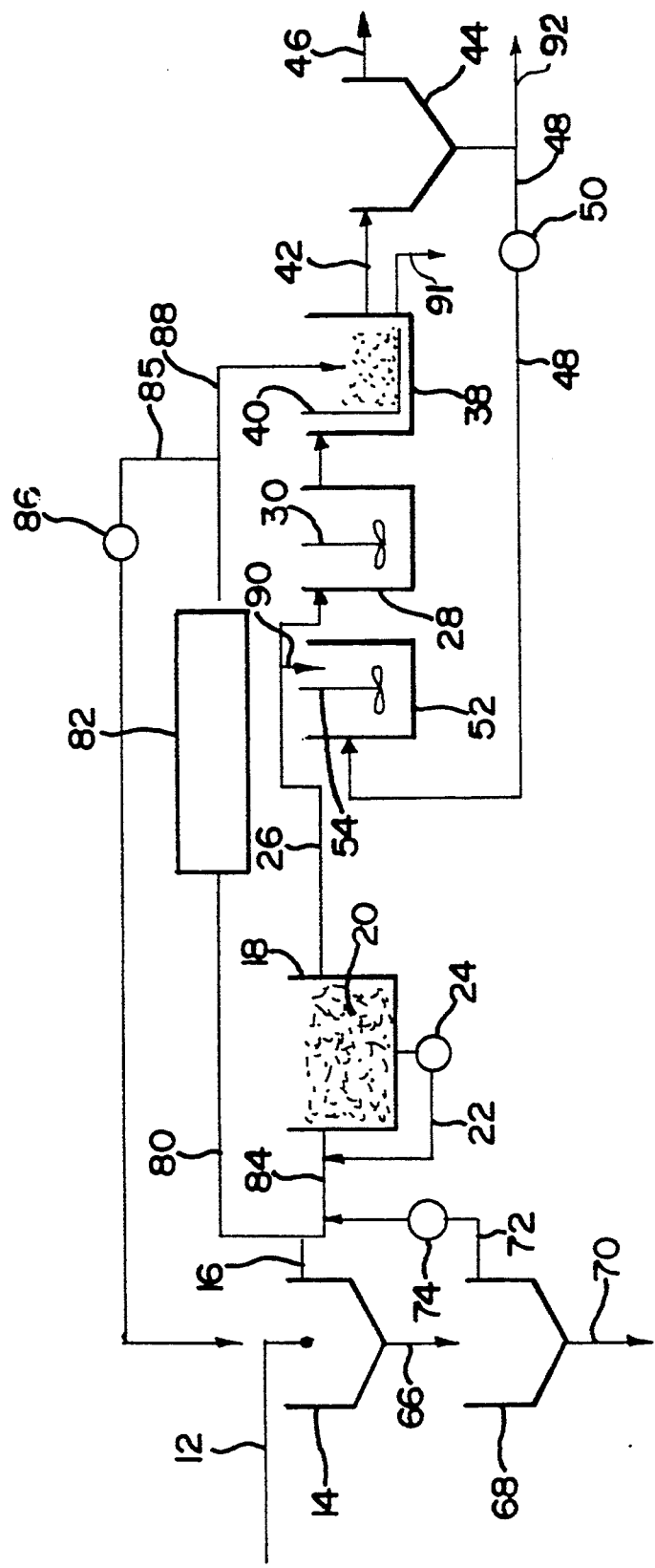
FIG. 4 shows a further embodiment of the process and installation of the invention in which the attached growth fermentation system is used for polishing trickling filter effluent.

In FIG. 4, the same reference numerals are used for the same items or parts of the installation shown in FIG. 1 unless otherwise specified. In this installation the primary separation basin 14 and the thickener 68 are similar to that in FIG. 1. However, the flow in flow line 16 is split such that a portion of the flow is passed via a flow line 80 to a so-called trickling filter 82, and a portion of the flow is passed via a flow line 84 to the fermenter 18.

Effluent from the thickener 68 is pumped via flow line 72 by a pump 74 to the flow line 84 which then passes into the fermenter 18. The effluent may alternatively (not shown) be pumped to the flow line 26 which discharges to the contact vessel 28.

Portion of the effluent from the trickling filter 82 is pumped via a flow line 85 by means of a pumping device 86 back to the inlet of the separation basin 14. Another portion of the effluent from the trickling filter 82 is not so recycled and is passed via flow line 88 to the aeration vessel 38 which is provided with an aeration device 40 as in FIG. 1.

The effluent from the fermenter 18 is passed to the contact vessel 28 via the flow line 26 and then into the aeration vessel 38.

The effluent from the aeration vessel 38 is passed via the flow line 42 into the secondary separation basin 44 as in FIG. 1. The activated sludge is pumped via the flow line 48, using the pumping device 50, to the holding tank 52 where reduction of remaining nitrates will take place.

As in FIG. 1, denitrification in the holding vessel 52 will occur partially by endogenous respiration and partially by reaction with a portion of the effluent from the fermenter 18 which enters the holding vessel 52 via a flow line 90.

The installation of FIG. 4 is similar to that of FIG. 1 in many respects with the exception that the anoxic stage 34 has been omitted as well as the recycle flow line 42 which recycles effluent from the aeration vessel 38 back to the anoxic vessel 34 in FIG. 1.

A further variation (not shown) of FIG. 4 may include the removal of nitrates using only the fermenter 18 instead of the holding vessel 52. In this case the effluent from this fermenter 18 will be passed to the flow line 26 for total discharge into the contact vessel 28.

As in the case of FIG. 1, just sufficient air will be supplied in the contact vessel 28 to limit any secondary release of phosphates; this may be achieved by having the vessel 28 open to the atmosphere.

The effluent flow of the trickling filter 82 may be upgraded to facilitate partial nitrogen and high phosphate removal. Since nearly all available carbon compounds are removed in the trickling filter 82, and since carbon is required for phosphate removal, no attempt is made at full nitrogen removal but the system is operated to allow the maximum removal of phosphates.

The Applicant believes that the invention as illustrated will permit the economical and effective removal of organic material, nitrogenous compounds and phosphates from wastewater.

I claim:

1. A process for the biological treatment of wastewater to remove organic material, nitrogenous compounds and phosphates comprising the steps of:
   directing the wastewater to a first solids separation stage to separate the wastewater into a settled sludge portion and a liquid portion;
   directing the liquid portion through an anaerobic acid fermentation stage and fermenting the liquid portion to produce a liquid portion that includes volatile fatty acids;
   splitting the resulting liquid portion into at least two streams;
   transferring one stream to a contact stage and mixing the liquid with activated sludge that is low in nitrogen oxides and that contains phosphorus removing micro-organisms that are exposed to a limited amount of oxygen, the volatile fatty acids providing a food source for the micro-organisms;
   conveying the contact stage effluent to an aerobic stage where sufficient oxygen is provided to allow the phosphorus removing organisms to absorb phosphorus, thereby reducing the amount of phosphorus;
   conveying the aerobic stage effluent to a second solids separation stage to separate the aerobic stage effluent into activated sludge and purified liquid;
   returning at least a portion of the activated sludge to a holding stage that precedes the contact stage;
   transferring the other stream from the fermentation stage to the holding stage and mixing the liquid with the returned activated sludge, the volatile fatty acids providing a favourable food source for denitrifying microorganisms to reduce the levels of nitrogen; and
   conveying the low nitrogen oxides activated sludge of the holding stage to the contact stage.

2. A process as claimed in claim 1 including the additional step of conveying the contact stage effluent to an anoxic stage prior to the aerobic stage where nitrogen levels are further reduced.

3. A process as claimed in claim 2 including the additional step of recycling a portion of the aerobic stage effluent containing high levels of nitrogen to the anoxic stage.

4. A process as claimed in claim 1 in which some effluent from the anaerobic fermentation stage is recycled back to the anaerobic fermentation stage.

5. A process as claimed in claim 1 in which the activated sludge of the second solids separation stage is passed through a secondary attached growth fermenter to enhance removal of nitrogenous compounds prior to being conveyed to the holding stage.

6. A process as claimed in claim 1 in which the phosphorus absorbing micro-organism is *Acinetobacter spp.*

7. A process as claimed in claim 1 in which conditions during the anaerobic fermentation stage are selected and controlled so that acetic acid and/or salts thereof form the major portion by mass of volatile fatty acids produced.

8. A process as claimed in claim 1 including the additional step of splitting the liquid from the first solids separation stage into at least two streams and directing one stream to a trickling filter stage and the other stream to the anaerobic fermentation stage.

9. A process as claimed in claim 8 in which a portion of the effluent from the trickling filter is directed to the aerobic stage and the other portion of the effluent from the trickling filter is recycled to the first solids separation stage.

10. A process as claimed in claim 1 including solid supports located in the anaerobic fermentation stage to support the fermenting micro-organisms.

* * * * *